(12) United States Patent
Pfeiffer

(10) Patent No.: US 9,581,231 B2
(45) Date of Patent: Feb. 28, 2017

(54) SPROCKET

(71) Applicant: Wolf Tooth Components, LLC, Savage, MN (US)

(72) Inventor: Michael W. Pfeiffer, Savage, MN (US)

(73) Assignee: Wolf Tooth Components, LLC, Savage, MN (US)

( * ) Notice: Subject to any disclaimer, the term of this patent is extended or adjusted under 35 U.S.C. 154(b) by 186 days.

(21) Appl. No.: 14/601,872

(22) Filed: Jan. 21, 2015

(65) Prior Publication Data

US 2015/0285364 A1    Oct. 8, 2015

Related U.S. Application Data

(60) Provisional application No. 61/976,652, filed on Apr. 8, 2014.

(51) Int. Cl.
*F16H 55/30* (2006.01)
*B62M 9/10* (2006.01)

(52) U.S. Cl.
CPC .............. *F16H 55/30* (2013.01); *B62M 9/10* (2013.01)

(58) Field of Classification Search
CPC .................................. F16H 55/30; B62M 9/10
USPC ........................................................ 474/152
See application file for complete search history.

(56) References Cited

U.S. PATENT DOCUMENTS

| 257,445 A | 5/1882 | Lechner |
| 495,584 A | 4/1893 | Guthrie |
| 536,813 A | 4/1895 | MacPhail et al. |
| 586,991 A | 7/1897 | Curley |
| 590,649 A | 9/1897 | Ribyn, Jr. |
| 591,270 A | 10/1897 | Gauthier |
| 619,537 A | 2/1899 | Bufford |
| 1,482,896 A | 2/1924 | Huntington et al. |
| 1,835,406 A | 12/1931 | Kirsten |
| 2,602,343 A | 7/1952 | Barrett et al. |
| 3,391,863 A | 7/1968 | Huffman et al. |
| 3,654,814 A * | 4/1972 | Richmond ............. F16H 55/30 474/156 |
| 3,730,009 A | 5/1973 | Mead et al. |
| 3,745,851 A | 7/1973 | Zeldman et al. |
| 3,956,943 A | 5/1976 | Yamasaki |
| 3,969,947 A | 7/1976 | Martin et al. |
| 3,990,136 A | 11/1976 | Hishida |

(Continued)

FOREIGN PATENT DOCUMENTS

| DE | 1086957 B | 8/1960 |
| DE | 2816137 A1 | 10/1979 |

(Continued)

OTHER PUBLICATIONS

Third-Party Submission submitted in U.S. Appl. No. 14/596,761 on Dec. 17, 2015.

*Primary Examiner* — William E Dondero
*Assistant Examiner* — Mark K Buse
(74) *Attorney, Agent, or Firm* — Dicke, Billig & Czaja, PLLC

(57) ABSTRACT

A sprocket includes a first body with teeth radially projecting therefrom, and second bodies on alternating ones of the teeth, with the second bodies being asymmetrical about a plane extended radially from a rotational axis of the sprocket through a root center and a tip center of the alternating ones of the teeth, and the second bodies increasing an overall width of the alternating ones of the teeth.

22 Claims, 15 Drawing Sheets

(56) References Cited

U.S. PATENT DOCUMENTS

| | | | |
|---|---|---|---|
| 4,144,773 A | 3/1979 | Addicks | |
| 4,174,642 A | 11/1979 | Martin et al. | |
| 4,240,303 A | 12/1980 | Mosley | |
| 4,261,214 A | 4/1981 | Watanabe et al. | |
| 4,330,286 A | 5/1982 | Nagano | |
| 4,348,199 A | 9/1982 | Oonuma et al. | |
| 4,433,963 A | 2/1984 | Shimano | |
| 4,472,164 A | 9/1984 | Pusch et al. | |
| 4,501,575 A | 2/1985 | Lapeyre | |
| 4,586,914 A | 5/1986 | Nagano | |
| 4,589,860 A | 5/1986 | Brandenstein et al. | |
| 4,752,281 A * | 6/1988 | Lammers | B62D 55/0963 474/161 |
| 4,867,733 A | 9/1989 | Yamanoi et al. | |
| 5,026,329 A * | 6/1991 | Diekevers | B62D 55/0963 474/162 |
| 5,098,346 A | 3/1992 | Redmond | |
| 5,318,483 A | 6/1994 | Reid et al. | |
| 5,362,278 A | 11/1994 | Bergles et al. | |
| 5,503,598 A | 4/1996 | Neuer et al. | |
| 5,545,096 A | 8/1996 | Su | |
| 5,819,910 A * | 10/1998 | Langer | B66B 23/02 198/330 |
| 5,921,878 A | 7/1999 | Young | |
| 5,921,879 A | 7/1999 | Young | |
| 6,013,001 A | 1/2000 | Miyoshi | |
| 6,090,003 A | 7/2000 | Young | |
| D435,492 S | 12/2000 | Shy | |
| 6,190,275 B1 | 2/2001 | Ciancio et al. | |
| 6,203,462 B1 | 3/2001 | Takamori | |
| 6,220,970 B1 | 4/2001 | Berger et al. | |
| 6,325,734 B1 | 12/2001 | Young | |
| 6,340,338 B1 | 1/2002 | Kamada | |
| 6,468,173 B1 | 10/2002 | Jeong | |
| 6,500,084 B2 | 12/2002 | Wigsten | |
| 6,540,630 B1 | 4/2003 | Oertley | |
| D478,849 S | 8/2003 | Griffin et al. | |
| 6,666,786 B2 | 12/2003 | Yahata | |
| 6,761,657 B2 | 7/2004 | Young | |
| 6,899,651 B2 | 5/2005 | Oertley | |
| 7,094,170 B2 | 8/2006 | Young | |
| D540,718 S | 4/2007 | Wickliffe | |
| 7,416,500 B2 | 8/2008 | Young et al. | |
| 7,491,143 B2 | 2/2009 | Valle | |
| D599,255 S | 9/2009 | Wickliffe et al. | |
| D599,716 S | 9/2009 | Wickliffe et al. | |
| D599,717 S | 9/2009 | Wickliffe et al. | |
| D599,718 S | 9/2009 | Wickliffe et al. | |
| D599,719 S | 9/2009 | Wickliffe et al. | |
| D607,784 S | 1/2010 | Gisbert | |
| 7,686,721 B2 | 3/2010 | Tabe et al. | |
| 7,824,287 B2 | 11/2010 | Nonoshita et al. | |
| 7,967,709 B2 | 6/2011 | Emura et al. | |
| 8,365,881 B2 | 2/2013 | Iwai et al. | |
| D715,699 S | 10/2014 | Reiter et al. | |
| D716,191 S | 10/2014 | Reiter | |
| 8,882,619 B2 | 11/2014 | Braedt | |
| 8,888,631 B2 | 11/2014 | Morita | |
| 2002/0086753 A1 | 7/2002 | Yahata | |
| 2003/0083166 A1 | 5/2003 | Oertley | |
| 2005/0079940 A1 | 4/2005 | Reiter | |
| 2005/0272546 A1 | 12/2005 | Reiter | |
| 2005/0282672 A1 | 12/2005 | Nonoshita | |
| 2006/0073927 A1 | 4/2006 | Haesloop | |
| 2006/0128511 A1 | 6/2006 | Oishi et al. | |
| 2006/0258498 A1 | 11/2006 | Tabe et al. | |
| 2007/0054768 A1 * | 3/2007 | Miyazawa | F16H 55/30 474/152 |
| 2009/0082147 A1 | 3/2009 | Braedt | |
| 2010/0075791 A1 | 3/2010 | Braedt | |
| 2010/0227720 A1 | 9/2010 | Mehta et al. | |
| 2011/0092327 A1 | 4/2011 | Oishi | |
| 2011/0105263 A1 | 5/2011 | Braedt | |
| 2012/0225745 A1 | 9/2012 | Oishi et al. | |
| 2013/0072334 A1 | 3/2013 | Braedt | |
| 2013/0109519 A1 | 5/2013 | Morita | |
| 2013/0139642 A1 * | 6/2013 | Reiter | B62M 9/105 74/594.2 |
| 2013/0143704 A1 | 6/2013 | Blank et al. | |
| 2013/0184110 A1 * | 7/2013 | Reiter | F16H 55/303 474/152 |
| 2014/0100069 A1 | 4/2014 | Reiter et al. | |
| 2014/0162821 A1 | 6/2014 | Braedt et al. | |
| 2014/0335983 A1 | 11/2014 | Iwai et al. | |
| 2014/0335987 A1 | 11/2014 | Iwai et al. | |
| 2014/0338494 A1 | 11/2014 | Sugimoto et al. | |
| 2014/0364259 A1 * | 12/2014 | Reiter | F16H 55/30 474/155 |
| 2015/0094179 A1 * | 4/2015 | Iwai | F16H 55/30 474/152 |
| 2015/0198231 A1 | 7/2015 | Emura | |
| 2015/0203173 A1 | 7/2015 | Nishimoto et al. | |
| 2015/0239528 A1 | 8/2015 | Barefoot et al. | |
| 2015/0291255 A1 | 10/2015 | Nishimoto et al. | |
| 2015/0337943 A1 | 11/2015 | Sugimoto | |
| 2015/0362057 A1 | 12/2015 | Wesling et al. | |

FOREIGN PATENT DOCUMENTS

| | | |
|---|---|---|
| DE | 102012109931 A1 | 5/2013 |
| EP | 1764296 A1 | 3/2007 |
| FR | 2545902 A1 | 11/1984 |
| FR | 2657134 A1 | 7/1991 |
| GB | 2005363 A | 4/1979 |
| JP | 5642489 | 4/1981 |
| JP | S5642489 | 4/1981 |
| JP | 60104866 A | 6/1985 |
| JP | H1171795 | 12/1989 |
| JP | 2000355295 | 12/2000 |
| JP | 2001187957 A | 7/2001 |
| JP | 2002243020 A | 8/2002 |
| JP | 2007071302 | 3/2007 |
| JP | 2007198403 | 8/2007 |
| JP | 201236982 | 2/2012 |
| JP | 201324307 | 2/2013 |
| JP | 201379698 | 5/2013 |
| TW | i316490 | 11/2009 |
| TW | i338655 | 10/2010 |
| WO | 9806962 | 2/1998 |
| WO | 03095867 A1 | 11/2003 |

* cited by examiner

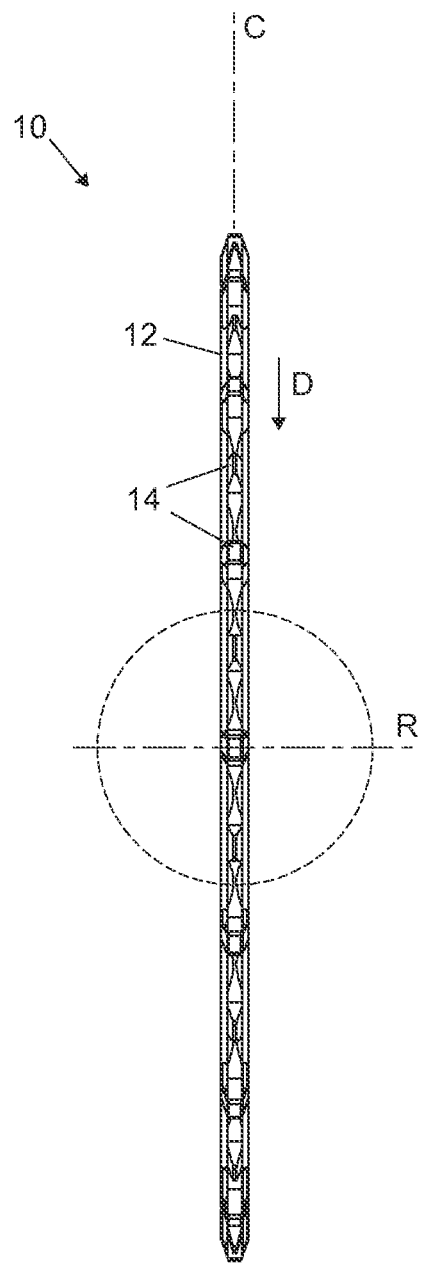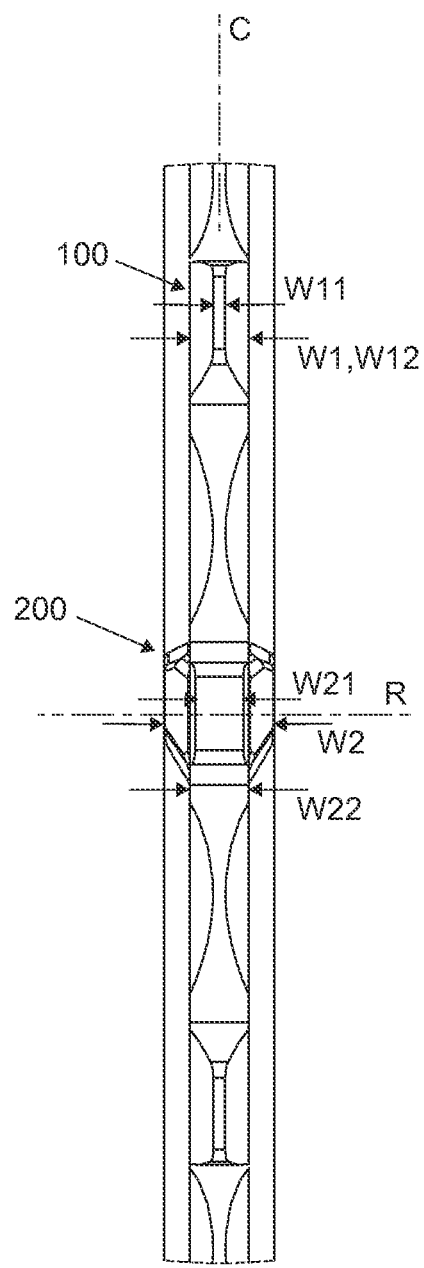
*FIG. 5*  *FIG. 6*

SPROCKET

CROSS-REFERENCE TO RELATED APPLICATIONS

This application claims priority under 35 U.S.C. §119(e) to U.S. Provisional Patent Application Ser. No. 61/976,652 filed on Apr. 8, 2014, and incorporated herein by reference.

This application is related to U.S. Non-Provisional Patent Application Ser. No. 14/601,867 filed on even date herewith.

BACKGROUND

The present disclosure relates generally to sprockets and, more specifically, relates to a sprocket having alternating wide and narrow teeth for use as a chainring on a bicycle.

BRIEF DESCRIPTION OF THE DRAWINGS

FIG. 5 is a side view of the sprocket of FIG. 1.

FIG. 6 is an enlarged view of the area within the broken line circle of FIG. 5.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Figure 1:
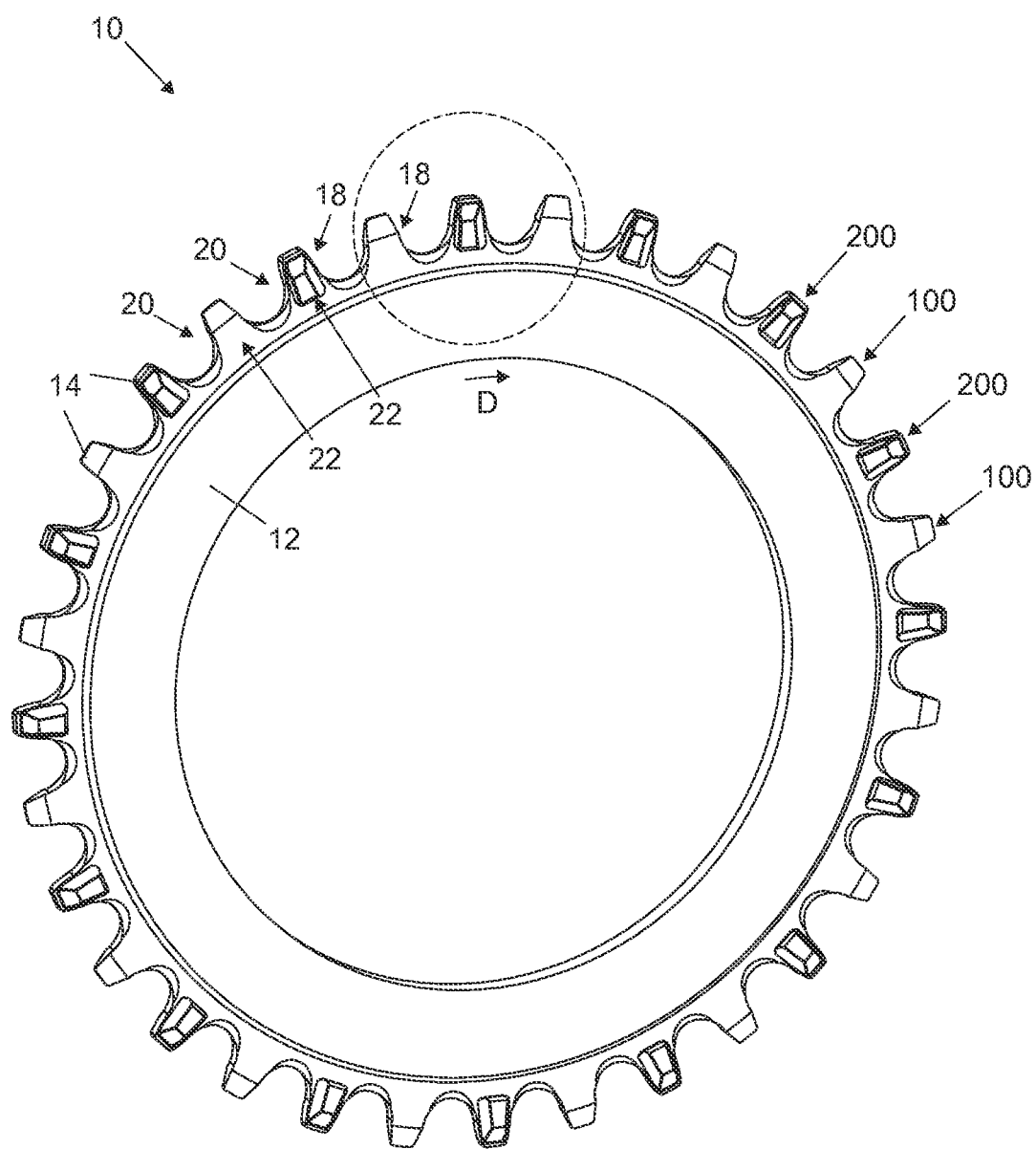
FIG. 1 is a left-front perspective view of one example of a sprocket in accordance with the present disclosure.
Figure 2:
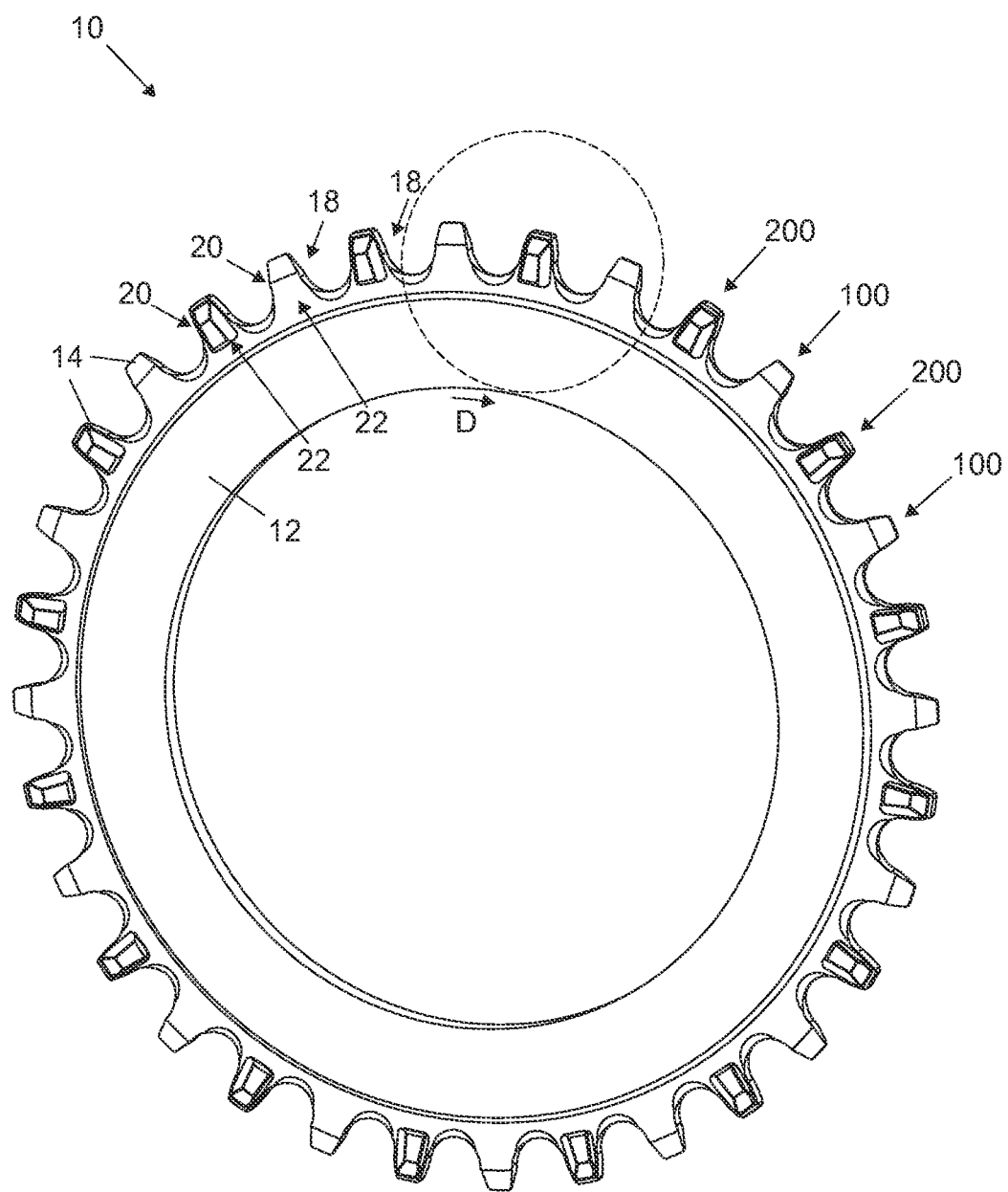
FIG. 2 is a right-front perspective view of the sprocket of FIG. 1.
Figure 3:
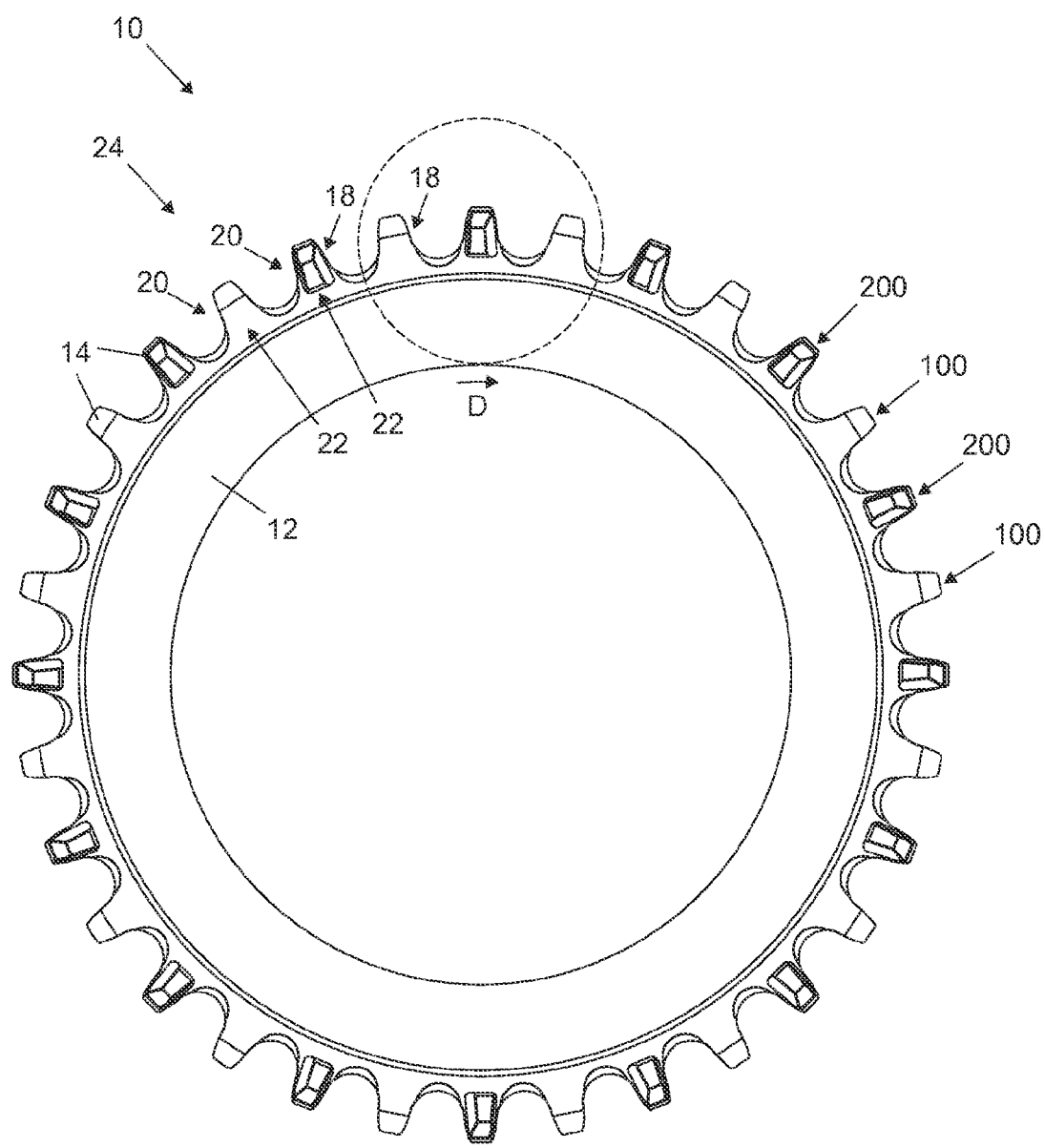
FIG. 3 is a front view of the sprocket of FIG. 1.
Figure 4A:
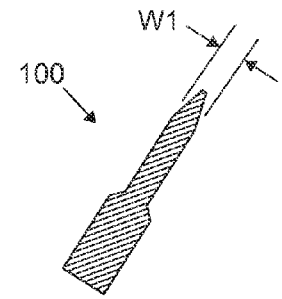
FIGS. 4A and 4B are cross-sectional views from the perspective of lines A-A and B-B, respectively, of FIG. 4.
Figure 4B:
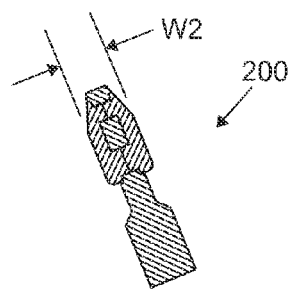
Figure 4:
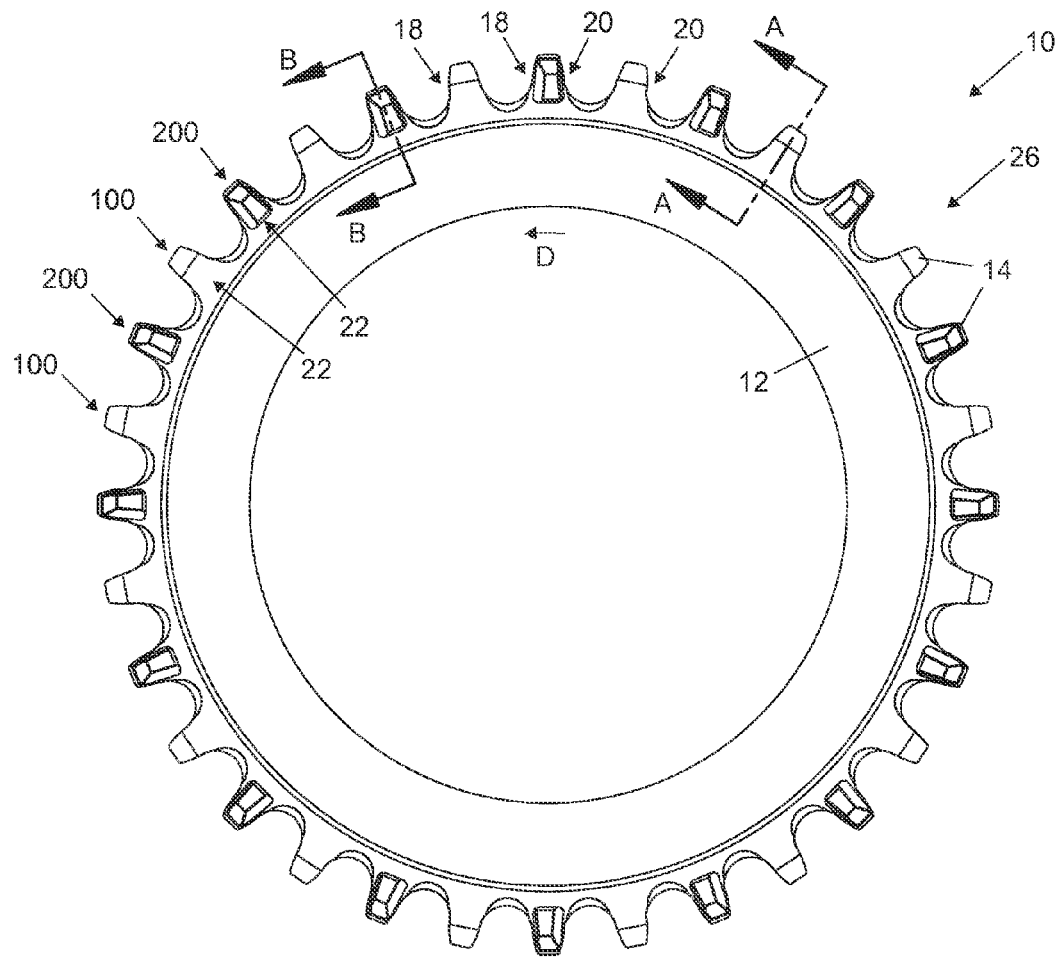
FIG. 4 is a rear view of the sprocket of FIG. 1.

FIGS. 1 and 2 are left-front and right-front perspective views, respectively, of one example of a sprocket 10 for use as a chainring on a bicycle (not shown). In addition, FIGS. 3 and 4 are front and rear views, respectively, of sprocket 10. Furthermore, FIG. 5 is a side view of sprocket 10, where the side view of FIG. 5 represents left, right, top, and bottom views of sprocket 10, and FIG. 6 is an enlarged view of the area within the broken line circle of FIG. 5.

As illustrated in FIGS. 1-6, sprocket 10 includes a body 12 and a plurality of teeth 14 radially, outwardly extending, projecting from body 12. In one example, body 12 includes one or more mounting holes (not shown) for mounting or securing sprocket 10 to a crank assembly (not shown) of a bicycle. It is understood that the number, size, form, configuration, and/or arrangement of mounting holes may vary. In addition, sprocket 10 may include one or more other features (in addition to and/or in place of mounting holes) to mount or secure sprocket 10 to a crank assembly.

In one example, sprocket 10 has a rotational axis R and a centerline C normal to rotational axis R such that sprocket 10 rotates about rotational axis R in a plane coinciding with centerline C normal to rotational axis R. In the example illustrated, sprocket 10 rotates in a drive direction D about rotational axis R such that teeth 14 each have a drive side 18 and a non-drive side 20 relative to drive direction D. In addition, teeth 14 each have opposite lateral sides 22 relative to centerline C and drive direction D. Although illustrated as being circular in shape, sprocket 10 may be non-circular, for example, elliptical, pseudo-elliptical, oval, ovoid, parabolic, etc.

The front view of FIG. 3 represents an outboard side 24 of sprocket 10 and the rear view of FIG. 4 represents an inboard side 26 of sprocket 10 when sprocket 10 is mounted or secured to a crank assembly of a bicycle and rotated (driven) in drive direction D. In one example, teeth 14 of sprocket 10 are substantially symmetrical about centerline C such that a shape or profile of teeth 14 on outboard side 24 and inboard side 26 substantially mirror each other. In one example, as described below, teeth 14 of sprocket 10 engage a roller chain such that rotation of sprocket 10 in drive direction D imparts movement to the roller chain.

In the example illustrated in FIGS. 1-6, teeth 14 include alternating teeth of different overall width or thickness. More specifically, in one example, and with reference to FIGS. 4A and 4B, teeth 14 include a plurality of first teeth 100 each having a first, overall width W1 (defined as or formed by a maximum width of first teeth 100 between opposite lateral sides 22) and a plurality of second teeth 200 each having a second, overall width W2 (defined as or formed by a maximum width of second teeth 200 between opposite lateral sides 22) such that second, overall width W2 is greater than first, overall width W1.

In one example, first teeth 100 and second teeth 200 are alternately arranged with one second tooth 200 positioned between two first teeth 100 (or one first tooth 100 positioned between two second teeth 200). As such, first teeth 100 and second teeth 200 form a sequence or series of alternating wide and narrow teeth about a periphery of sprocket 10. In one example, first teeth 100 and second teeth 200 each include an even number of teeth and, more specifically, each include the same number of teeth.

In one example, as illustrated in FIGS. 5 and 6, first teeth 100 and second teeth 200 are aligned along centerline C. In addition, in one example, first teeth 100 and second teeth 200 are substantially symmetrical about centerline C. As such, the shapes and/or profiles of first teeth 100 and second teeth 200 are substantially symmetrical about centerline C.

Figure 7:
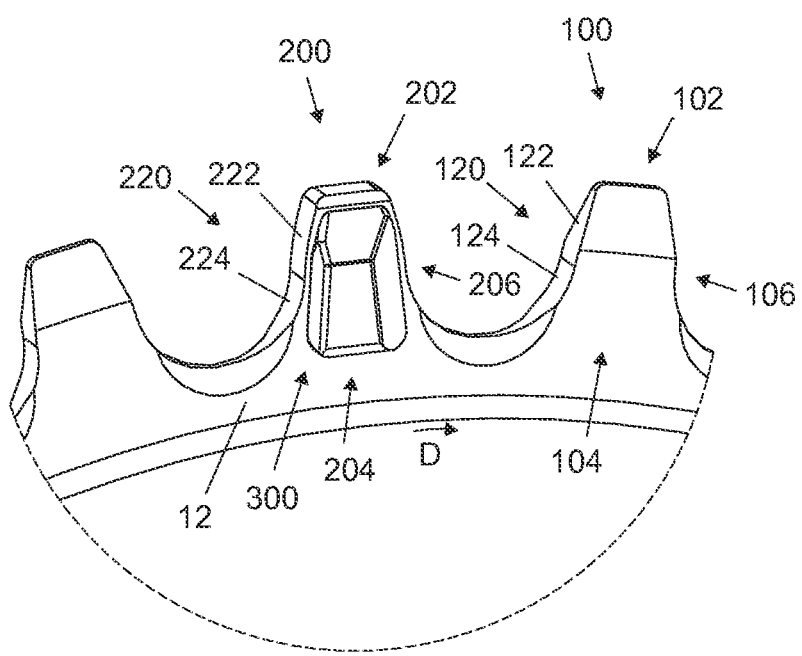
FIG. 7 is an enlarged view of the area within the broken line circle of FIG. 1.
Figure 8:
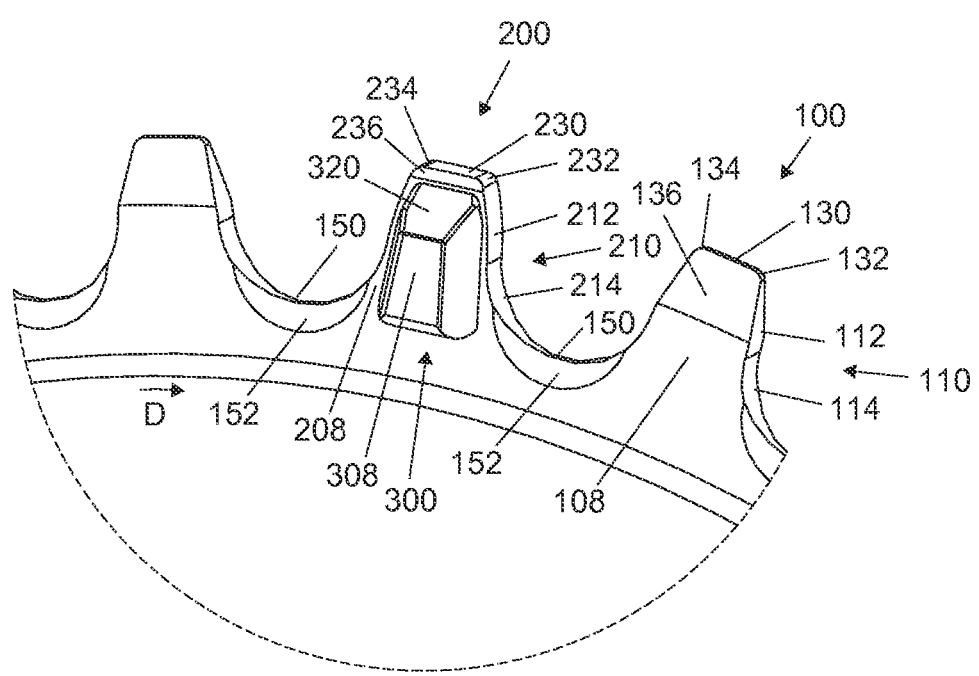
FIG. 8 is an enlarged view of the area within the broken line circle of FIG. 2.
Figure 9A:
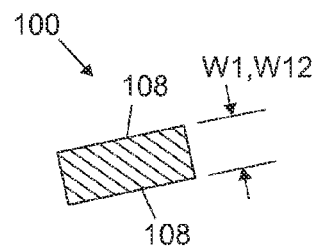
FIGS. 9A and 9B are cross-sectional views from the perspective of lines A-A and B-B, respectively, of FIG. 9.
Figure 9B:
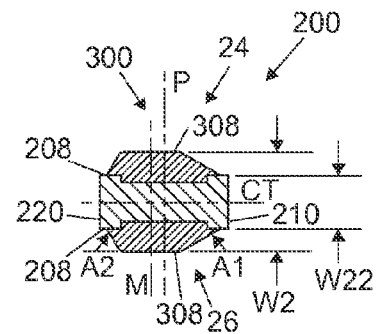
Figure 9:
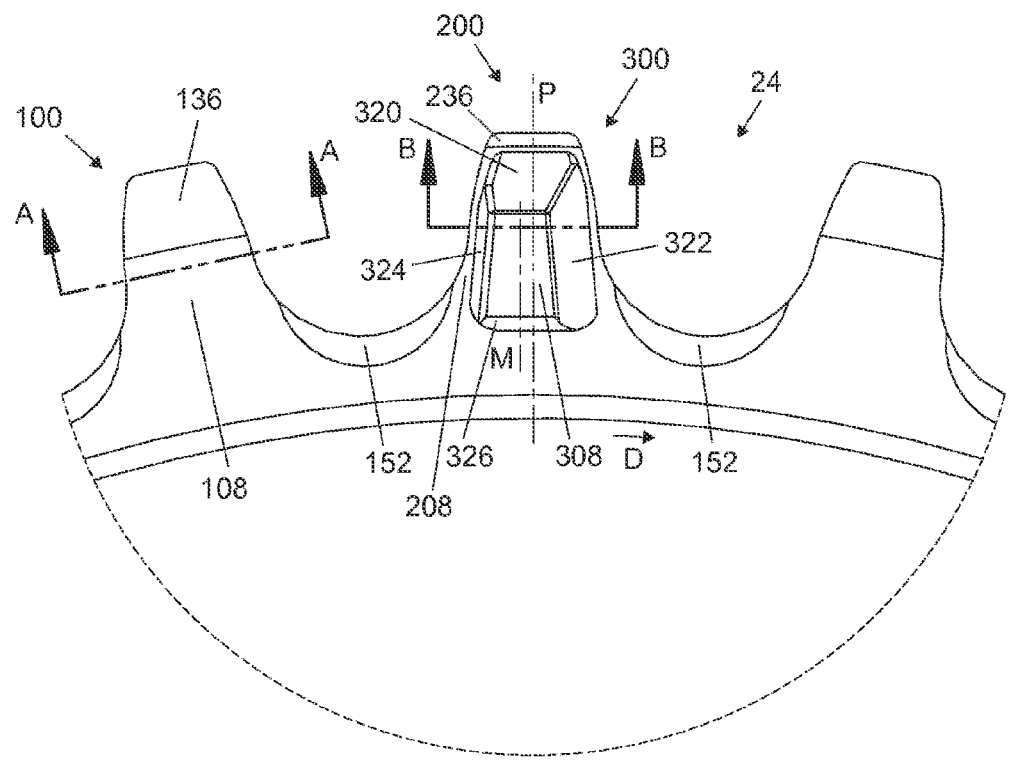
FIG. 9 is an enlarged view of the area within the broken line circle of FIG. 3.
Figure 10:
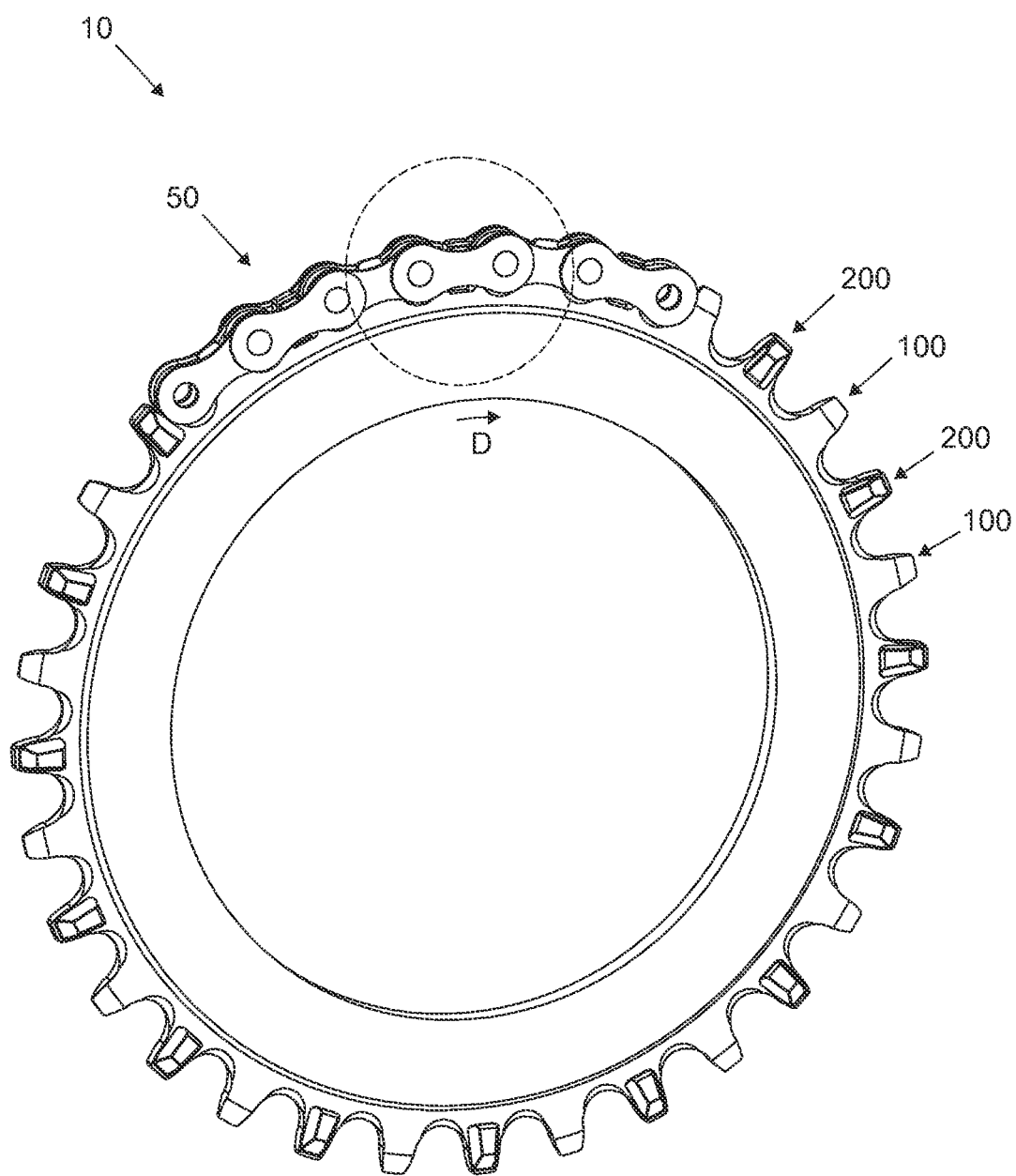
FIG. 10 is a left-front perspective view of one example of a sprocket in accordance with the present disclosure engaged with a section of a roller chain.
Figure 11:
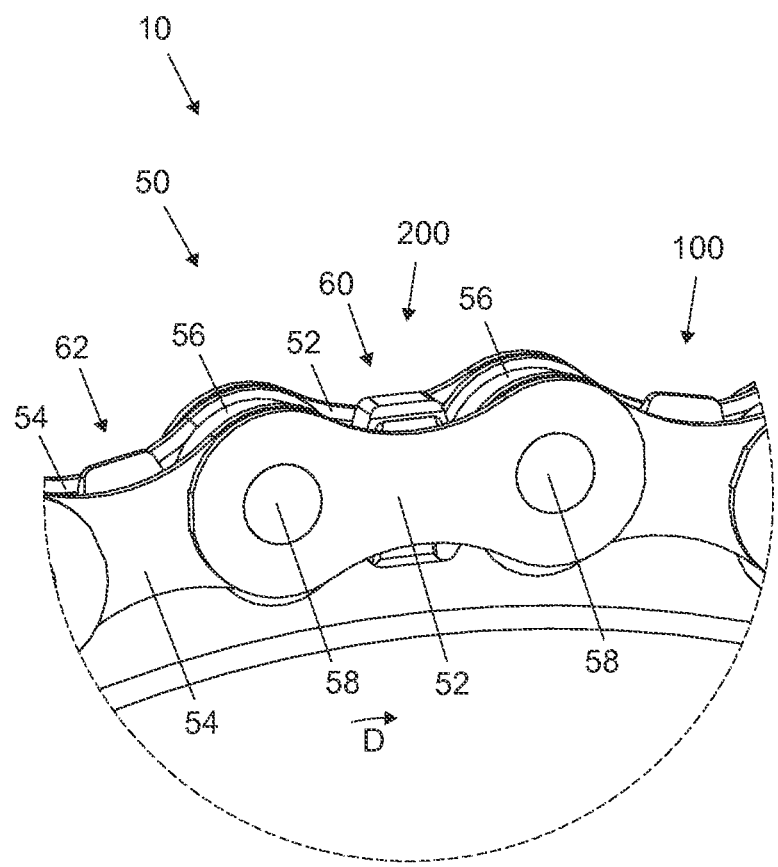
FIG. 11 is an enlarged view of the area within the broken line circle of FIG. 10.
Figure 12:
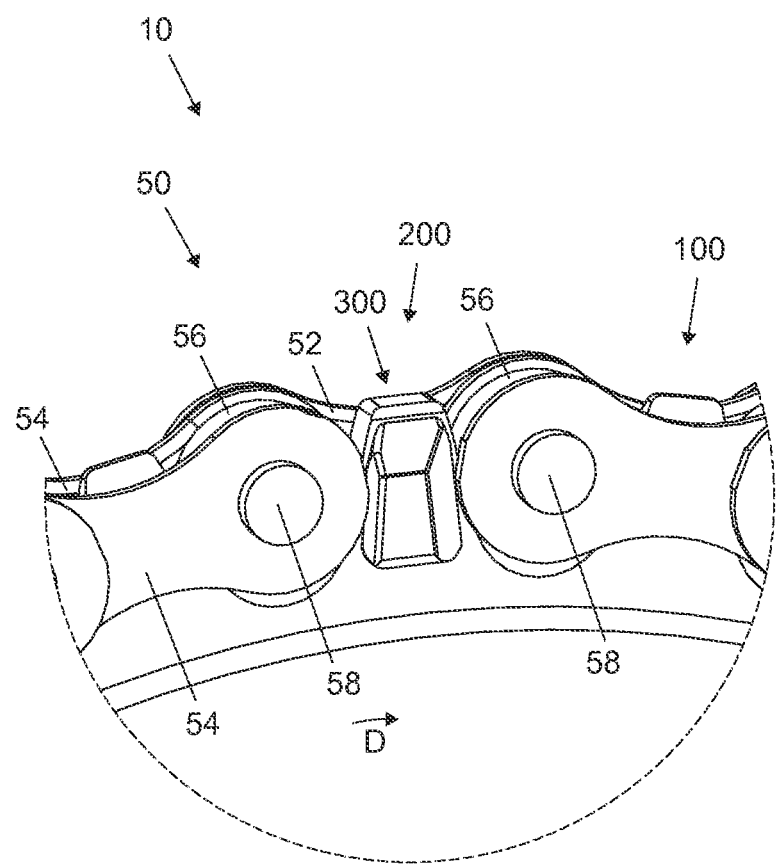
FIG. 12 is an enlarged view similar to FIG. 11 with an outer link plate removed from the roller chain on an outboard side of the sprocket.
Figure 13:
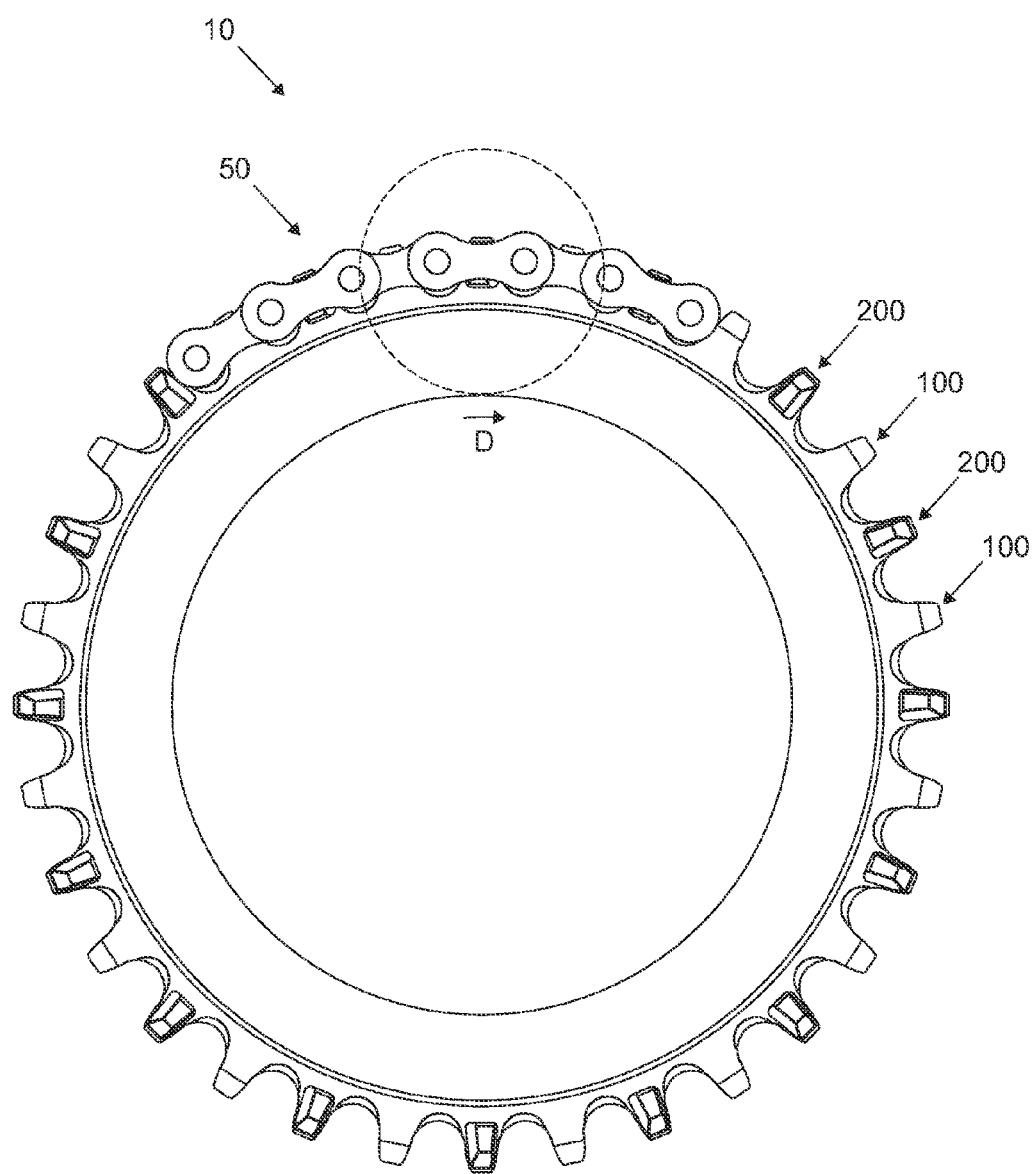
FIG. 13 is a front view of the sprocket of FIG. 10 engaged with a section of a roller chain.
Figure 14A:
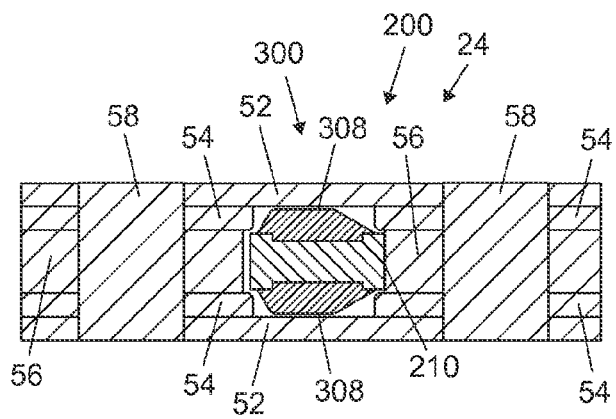
FIG. 14A is a cross-sectional view from the perspective of line A-A of FIG. 14.
Figure 14:
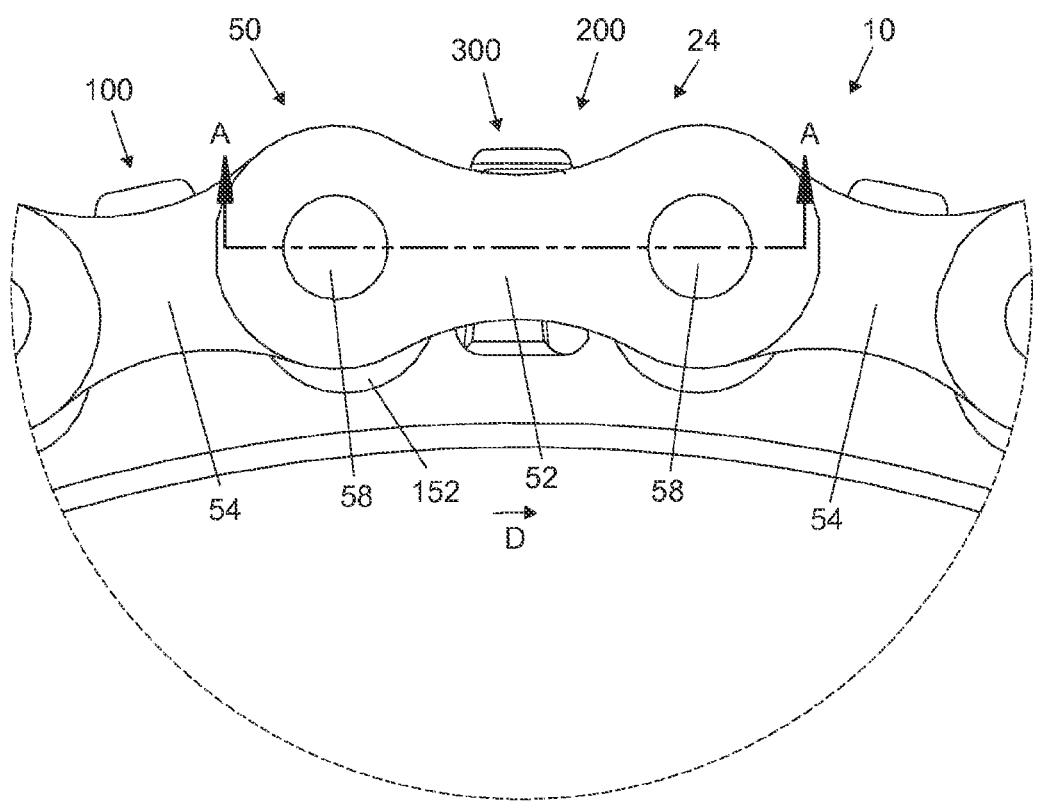
FIG. 14 is an enlarged view of the area within the broken line circle of FIG. 13.
Figure 15A:
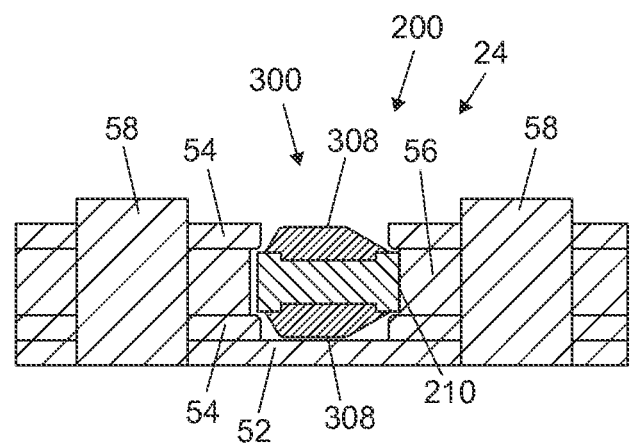
FIG. 15A is a cross-sectional view from the perspective of line A-A of FIG. 15.
Figure 15:
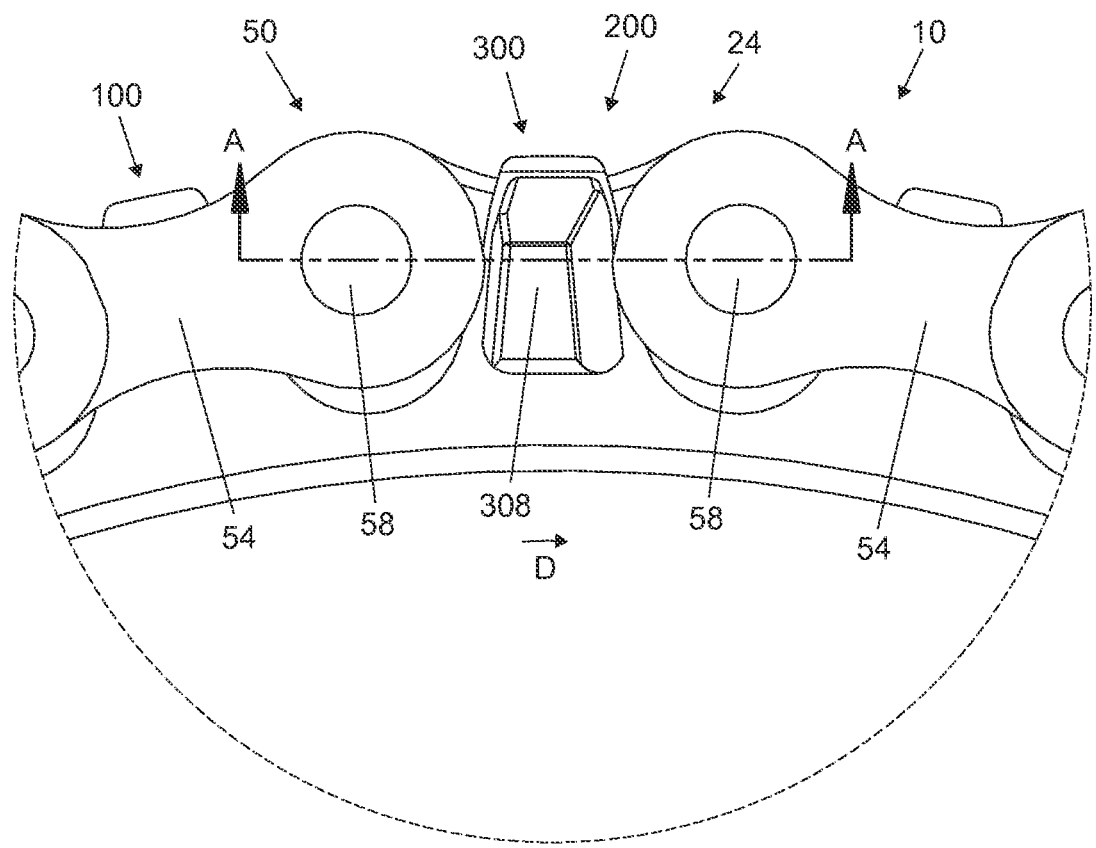
FIG. 15 is an enlarged view similar to FIG. 14 with an outer link plate removed from the roller chain on an outboard side of the sprocket.

FIGS. 7, 8, and 9 are enlarged views of the areas within the broken line circles of FIGS. 1, 2, and 3, respectively. More specifically, FIGS. 7, 8, and 9 illustrate the shapes and/or profiles of first teeth 100 and second teeth 200 from the perspective of outboard side 24 of sprocket 10. As teeth 14 of sprocket 10 are substantially symmetrical about centerline C, the illustrations and associated descriptions of the shapes and/or profiles of first teeth 100 and second teeth 200 from the perspective of outboard side 24 of sprocket 10 are also applicable to the shapes and/or profiles of first teeth 100 and second teeth 200 from the perspective of inboard side 26 of sprocket 10.

In one example, as illustrated in FIGS. 7, 8, and 9, first teeth 100 each terminate with a tip portion 102, and include a base or root portion 104 extended from body 12 of sprocket 10 and an intermediate portion 106 formed or defined between root portion 104 and tip portion 102. Intermediate portion 106 provides a lateral surface 108 of first teeth 100 such that a width W12 (FIG. 9A) of intermediate portion 106 is formed by or defined between lateral surfaces 108 as provided on opposite sides 22 of first teeth 100. In one example, first, overall width W1 of first teeth 100 is formed or defined by width W12 of intermediate portion 106.

In one example, first teeth 100 each include a front (leading) or drive-side surface 110 and a rear (trailing) or non-drive-side surface 120. In one example, drive-side surface 110 of first teeth 100 includes and/or is formed or defined by a drive-side face 112 and a drive-side flank 114, and non-drive-side surface 120 of first teeth 100 includes and/or is formed or defined by a non-drive-side face 122 and a non-drive-side flank 124. In one example, drive-side face 112 extends between a top land 130 of tip portion 102 and drive-side flank 114, and drive-side flank 114 extends between drive-side face 112 and a bottom land 150 formed and/or defined between adjacent teeth. In addition, non-drive-side face 122 extends between top land 130 of tip portion 102 and non-drive-side flank 124, and non-drive-side flank 124 extends between non-drive-side face 122 and bottom land 150 formed and/or defined between adjacent teeth.

In one example, tooth tip radii 132 and 134 provide a transition between top land 130 and drive-side face 112 of drive-side surface 110 and non-drive-side face 122 of non-drive-side surface 120, respectively. In addition, in one example, a width W11 (FIG. 6) of top land 130 is substantially uniform and coincides with and/or is substantially the same as a width of tooth tip radii 132 and 134 at the transition between top land 130 and drive-side face 112 of drive-side surface 110 and non-drive-side face 122 of non-drive-side surface 120.

In one example, first teeth 100 each include a lateral tooth tip chamfer 136 formed and/or defined between intermediate portion 106 and tip portion 102. As such, lateral tooth tip chamfer 136 reduces a width of and provides a taper to first teeth 100 in a radial direction from lateral surface 108 of intermediate portion 106 to top land 130 of tip portion 102. Thus, width W11 (FIG. 6) of top land 130 of first teeth 100 is less than width W12 (FIG. 6) of intermediate portion 106 of first teeth 100 as defined by opposite lateral surfaces 108.

In one example, as illustrated in FIGS. 7, 8, and 9, second teeth 200 each terminate with a tip portion 202, and include a base or root portion 204 extended from body 12 of sprocket 10 and an intermediate portion 206 formed or defined between root portion 204 and tip portion 202. Intermediate portion 206 provides a lateral surface 208 of second teeth 200 such that a width W22 (FIG. 9B) of intermediate portion 206 is formed by or defined between lateral surfaces 208 as provided on opposite sides 22 of second teeth 200. In addition, second teeth 200 each include a front (leading) or drive-side surface 210 and a rear (trailing) or non-drive-side surface 220.

In one example, drive-side surface 210 of second teeth 200 includes and/or is formed or defined by a drive-side face 212 and a drive-side flank 214, and non-drive-side surface 220 of second teeth 200 includes and/or is formed or defined by a non-drive-side face 222 and a non-drive-side flank 224. In one example, drive-side face 212 extends between a top land 230 of tip portion 202 and drive-side flank 214, and drive-side flank 214 extends between drive-side face 212 and bottom land 150 formed and/or defined between adjacent teeth. In addition, non-drive-side face 222 extends between top land 230 of tip portion 202 and non-drive-side flank 224, and non-drive-side flank 224 extends between non-drive-side face 222 and bottom land 150 formed and/or defined between adjacent teeth.

In one example, tooth tip radii 232 and 234 provide a transition between top land 230 and drive-side face 212 of drive-side surface 210 and non-drive-side face 222 of non-drive-side surface 220, respectively. In addition, in one example, a width W21 (FIG. 6) of top land 230 is substantially uniform and coincides with and/or is substantially the same as a width of tooth tip radii 232 and 234 at the transition between top land 230 and drive-side face 212 of drive-side surface 210 and non-drive-side face 222 of non-drive-side surface 220.

In one example, second teeth 200 each include a lateral tooth tip chamfer 236 formed and/or defined between intermediate portion 206 and tip portion 202. As such, lateral tooth tip chamfer 236 reduces a width of and provides a taper to second teeth 200 in a radial direction from lateral surface 208 of intermediate portion 206 to top land 230 of tip portion 202. Thus, width W21 (FIG. 6) of top land 230 of second teeth 200 is less than width W22 (FIG. 6) of intermediate portion 206 of second teeth 200 as defined by opposite lateral surfaces 208.

In one example, as illustrated in FIG. 6, width W21 of top land 230 of second teeth 200 is greater than width W11 (FIG. 6) of top land 130 of first teeth 100. Width W21 of top land 230, however, may be less than width W11 of top land 130. In addition, width W21 of top land 230 and width W11 of top land 130 may be substantially the same (substantially equal).

In one example, as illustrated in FIGS. 7, 8, and 9, second teeth 200 each include an insert 300. As such, second teeth 200 are composite or hybrid teeth each formed by a respective tooth 14 and a respective insert 300. In one example, insert 300 is an attachment or add-on to a respective tooth 14 and increases an effective, overall width of second teeth 200 in an axial direction. As such, sprocket 10 is a multi-body sprocket including body 12, as a first (ring-shaped) body with teeth 14, and inserts 300, as a plurality of second bodies, provided on alternating teeth 14 to form second teeth 200 with second, overall width W2 (FIG. 9B).

In one example, insert 300 is formed of a material different than that of teeth 14 (as formed with body 12). More specifically, in one example, insert 300 is formed of a polymer material, ceramic, steel, bronze, or other alloy, or other material, and teeth 14 are formed of steel, titanium, aluminum or an aluminum alloy, or other material. In addition, material of insert 300 may be selected to provide specific and/or desired contact and/or guiding characteristics including, for example, specific and/or desired wear and/or abrasion resistance and/or lubricating and/or acoustic properties.

Figure 8A:
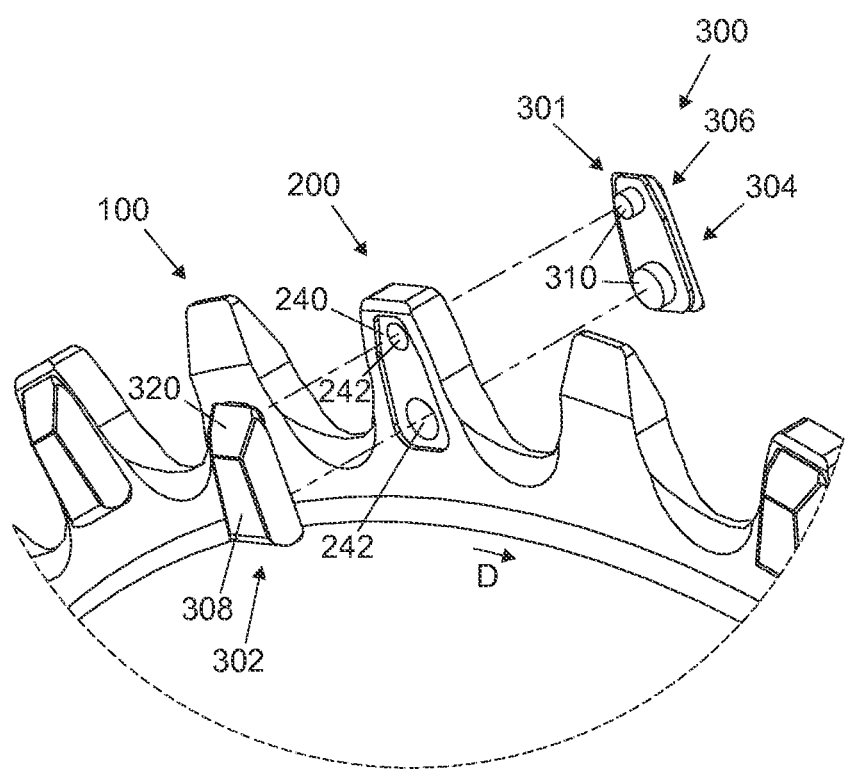
FIG. 8A is an exploded view of an area similar to FIG. 8.

In one example, as illustrated in FIG. 8A, insert 300 includes insert portions 301 and 302. In one example, insert portions 301 and 302 (substantially) mirror each other, and each include a lateral portion 304 and a tip portion 306 extended from lateral portion 304. In one example, lateral portion 304 provides a lateral surface 308 of second teeth 200 such that second, overall width W2 (FIG. 9B) of second teeth 200 is formed by or defined as a maximum width between lateral surfaces 308 of insert 300 as provided on opposite sides 22 of second teeth 200.

In one example, tip portion 306 is tapered in a radial direction from lateral surface 308 of lateral portion 304 to an end or tip of insert 300 to provide a beveled or chamfer surface 320. As such, chamfer surface 320 provides a lateral (tooth tip) chamfer surface of or to second teeth 200.

In one example, as illustrated in FIG. 9, insert 300 is tapered from lateral surface 308 of lateral portion 304 toward drive-side surface 210 of second teeth 200 to provide a beveled or chamfer surface 322, and tapered from lateral surface 308 of lateral portion 304 toward non-drive-side surface 220 of second teeth 200 to provide a beveled or chamfer surface 324. In addition, in one example, insert 300 is tapered from lateral surface 308 of lateral portion 304 toward root portion 204 of second teeth 200 to provide a beveled or chamfer surface 326. Furthermore, in one example, lateral portion 304 converges toward tip portion 306, such that insert 300 has a generally tapered baguette or keystone profile and/or shape. Insert 300, however, may have other profiles and/or shapes.

In one example, insert 300 is asymmetrical about a plane P (FIG. 9, 9B) extended radially from rotational axis R (FIG. 5) through a tooth root center and tooth tip center of a respective second tooth 200. More specifically, in one example, asymmetry of insert 300 includes lateral surface 308 being offset in a direction opposite drive direction D relative to plane P. More specifically, in one example, a midline M of lateral surface 308 is offset ("shifted") in a direction opposite drive direction D relative to plane P. In addition, in one example, asymmetry of second teeth 200 includes an (absolute value of) angle A1 of surface 322 relative to lateral surface 308 being less than an (absolute value of) angle A2 of surface 324 relative to lateral surface 308.

In one example, second teeth 200, with respective inserts 300, are symmetrical about a tooth centerline CT (FIG. 9B) extended through drive-side surface 210 and non-drive-side surface 220. More specifically, in one example, tooth centerline CT intersects (bisects) drive-side surface 210 and non-drive-side surface 220, and is oriented substantially perpendicular to plane P. Thus, in one example, second teeth 200, with respective inserts 300, are asymmetrical about plane P (FIG. 9, 9B) and symmetrical about tooth centerline CT (FIG. 9B). In one example, tooth centerline CT coincides with centerline C of sprocket 10 (FIG. 5, 6). Tooth centerline CT, however, may be offset from centerline C of sprocket 10.

In one example, insert 300, including insert portions 301 and 302, is a separate or discrete component mated with and/or attached or joined to a respective second tooth 200. In one example, as illustrated in FIG. 8A, insert portions 301 and 302 of a respective insert 300 are mated with and/or attached or joined to a respective second tooth 200 in an axial direction. Thus, insert 300 represents an axial insert. Insert portions 301 and 302 of insert 300 may be, for example, bonded, swaged, press-fit, welded, brazed, heat-staked, over-molded or otherwise mated with and/or attached or joined to a respective second tooth 200.

In one example, insert portions 301 and 302 each include one or more protrusions or mounting posts 310, and second teeth 200 include one or more cavities or holes 240 corresponding to and defined or formed to receive protrusions or mounting posts 310. As such, protrusions or mounting posts 310 of a respective insert 300 are fit or received within cavities or holes 240 of a respective second tooth 200. In one example, protrusions or mounting posts 310 are in contact with each other and/or joined together when fit or received within holes 240. In one example, cavities or holes 240 are formed within a recessed area 242 of second teeth 200, and insert portions 301 and 302 are fit or received within recessed area 242. Insert portions 301 and 302, however, may be otherwise mated with and/or attached or joined to a respective second tooth 200.

FIGS. 10-15 illustrate one example of sprocket 10 engaged with a section of a roller chain 50. Sprocket 10 engages roller chain 50 such that rotation of sprocket 10 about rotational axis R (FIG. 5) in drive direction D imparts movement to roller chain 50. In one example, roller chain 50 includes and/or is formed by alternating, overlapping pairs of laterally spaced apart outer link plates 52 and laterally spaced apart inner link plates 54.

In one example, cylindrical rollers 56 are provided between inner link plates 54 at opposite ends of inner link plates 54, and outer link plates 52 and inner link plates 54 are pivotally interconnected by link pins 58 extended through rollers 56 and overlapping, opposite ends of outer link plates 52 and inner link plates 54. As such, inner link plates 54 are interleaved with outer link plates 52, and outer link plates 52 and inner link plates 54 form alternating teeth receiving openings or spacings of different width. More specifically, in one example, outer link plates 52 and inner link plates 54 form alternating wide and narrow teeth receiving openings 60 and 62, respectively.

In one example, alternating wide and narrow teeth receiving openings 60 and 62 of roller chain 50 are engaged by respective alternating wide and narrow teeth 14 of sprocket 10. More specifically, second (wide) teeth 200 of sprocket 10 engage wide teeth receiving openings 60, and first (narrow) teeth 100 of sprocket 10 engage narrow teeth receiving openings 62. As such, in one example, width W2 (FIG. 4B) of second teeth 200 and width W1 (FIG. 4A) of first teeth 100 correspondingly cooperate with wide teeth receiving openings 60 and narrow teeth receiving openings 62, respectively, of roller chain 50.

In one example, a relief 152 is provided in bottom land 150 between adjacent teeth 100 and 200. In one example, relief 152 extends between drive-side 18 of one tooth and non-drive-side 20 of an adjacent tooth (or between non-drive-side 20 of one tooth and drive-side 18 of an adjacent tooth). In one example, separate reliefs 152 are provided in bottom land 150 on outboard side 24 and inboard side 26 of sprocket 10.

In one example, relief 152 includes and/or is formed or defined by an arcuate chamfer formed between bottom land 150 and body 12 of sprocket 10, and between the drive-side flank of one tooth and the non-drive-side flank of an adjacent tooth. More specifically, in one example, one relief 152 extends from drive-side flank 114 of first teeth 100 to non-drive-side flank 224 and non-drive-side flank relief 254 of an adjacent second tooth 200, and another relief 152 extends from drive-side-flank 214 and drive-side flank relief 244 of second teeth 200 to non-drive-side flank 124 of an adjacent first tooth 100. Providing relief 152 in bottom land 150 between adjacent teeth 100 and 200 helps to clear debris (e.g., mud) from bottom land 150 so as to clear an area for rollers 56 of roller chain 50.

In one example, as illustrated in FIGS. 14 and 14A and FIGS. 15 and 15A, when sprocket 10 is engaged with roller chain 50 and rotated (driven) in drive direction D, contact between teeth 14 of sprocket 10 and roller chain 50 includes contact between drive side 18 of teeth 14 and roller chain 50 and between lateral sides 22 of teeth 14 and roller chain 50. More specifically, when sprocket 10 is engaged with roller chain 50 and rotated (driven) in drive direction D, contact between second teeth 200 of sprocket 10 and roller chain 50 includes contact (direct contact) between drive-side surface 210 and rollers 56, and contact (incidental contact) between lateral surface 308 of insert 300 and outer link plates 52.

In addition, in one example, when sprocket 10 is engaged with roller chain 50 and rotated (driven) in drive direction D, tension is generated on roller chain 50 in a direction of drive direction D such that, in one example, any stretch or "play" in roller chain 50 results in reduced (minimal) contact between non-drive-side surface 220 and rollers 56 of roller chain 50 (as compared to contact between drive-side surface 210 and rollers 56). As such, in one example, lateral surface 308 of insert 300 is extended toward non-drive-side surface 220 to increase (maximize) a surface area of lateral surface 308, as manifested in the asymmetry of insert 300.

With second teeth 200 including insert 300, as illustrated and described herein, contact between drive-side surface 210 of second teeth 200 and rollers 56 of roller chain 50 may be maintained (maximized) while maintaining clearance between second teeth 200 and inner link plates 54 of roller chain 50. In addition, with the asymmetry of insert 300, as illustrated and described herein, contact between lateral surface 308 of insert 300 and outer link plates 52 of roller chain 50 may be maintained (maximized) while maintaining clearance between second teeth 200 and inner link plates 54 of roller chain 50. As such, drive-side surface 210 may fit more deeply within an area ("pocket") formed between inner link plates 54 and rollers 56, so as to maximize (increase) contact between drive-side surface 210 and rollers 56 of roller chain 50.

Thus, by maintaining (maximizing) contact between drive-side surface 210 of second teeth 200 and rollers 56 of roller chain 50, and/or by maintaining (maximizing) contact between lateral surface 308 of insert 300 and outer link plates 52 of roller chain 50, retention of roller chain 50 on sprocket 10 may be maintained (improved). In addition, by maintaining (maximizing) contact between drive-side surface 210 of second teeth 200 and rollers 56 of roller chain 50, and/or by maintaining (maximizing) contact between lateral surface 308 of insert 300 and outer link plates 52 of roller chain 50, wear of sprocket 10 may be minimized (improved).

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A sprocket, comprising:
a first body with a plurality of teeth radially projecting therefrom; and
second bodies on and limited to alternating teeth of the plurality of teeth,
the second bodies being asymmetrical about a plane extended radially from a rotational axis of the sprocket through a root center and a tip center of the alternating teeth of the plurality of teeth,
the second bodies added to the alternating teeth to increase an overall axial width of the alternating teeth of the plurality of teeth.

2. The sprocket of claim 1, wherein the plurality of teeth and the alternating teeth of the plurality of teeth, with the second bodies, comprise a series of alternating axially wide and axially narrow teeth relative to each other.

3. The sprocket of claim 1, wherein the plurality of teeth, including the alternating teeth of the plurality of teeth, have a first maximum axial width between lateral surfaces thereof, and the second bodies on the alternating teeth of the plurality of teeth define a second maximum axial width greater than the first maximum axial width between lateral surfaces thereof.

4. The sprocket of claim 1, wherein the alternating teeth of the plurality of teeth, with the second bodies, are substantially symmetrical about a centerline oriented substantially perpendicular to the plane extended radially from the rotational axis of the sprocket.

5. The sprocket of claim 1, wherein the first body is formed of a first material, and the second bodies are formed of a second material.

6. The sprocket of claim 1, wherein the second bodies comprise axial inserts.

7. The sprocket of claim 1, wherein the sprocket comprises a chainring.

8. A sprocket, comprising:
first teeth having a first maximum axial width; and
second teeth having a second maximum axial width greater than the first maximum axial width, the second teeth alternately arranged with the first teeth,
the second teeth each having insert portions to define the second maximum axial width thereof, the first teeth free of the insert portions, and
a longitudinal midline of a lateral surface of the insert portions being offset relative to a plane extended radially through a center of a respective one of the second teeth.

9. The sprocket of claim 8, wherein the second teeth are substantially symmetrical about a centerline oriented substantially perpendicular to the plane extended radially through a center of a respective one of the second teeth.

10. The sprocket of claim 8, wherein the sprocket is to rotate in a drive direction about a rotational axis thereof, wherein the longitudinal midline of the lateral surface of the insert portions is offset in a direction opposite the drive direction of the sprocket.

11. The sprocket of claim 8, wherein the first teeth and the second teeth each include a tip portion, a root portion, and an intermediate portion therebetween, wherein an axial width of the intermediate portion of the second teeth is substantially equal to an axial width of the intermediate portion of the first teeth.

12. The sprocket of claim 11, wherein the first maximum axial width of the first teeth is defined at the intermediate portion of the first teeth.

13. The sprocket of claim 8, wherein the second maximum axial width of the second teeth is defined at the lateral surface of the insert portions.

14. The sprocket of claim 13, wherein the sprocket is to rotate in a drive direction about a rotational axis thereof, wherein the lateral surface of the insert portions is offset in a direction opposite the drive direction of the sprocket.

15. The sprocket of claim 13, wherein the sprocket is to rotate in a drive direction about a rotational axis thereof, wherein the insert portions are tapered at a first angle from the lateral surface toward a drive side of the second teeth relative to the drive direction, and tapered at a second angle greater than the first angle from the lateral surface toward a non-drive side of the second teeth relative to the drive direction.

16. The sprocket of claim 8, wherein the insert portions comprise a first insert portion on a first side of the sprocket, and a second insert portion on a second side of the sprocket.

17. A sprocket, comprising:
first teeth having a first maximum axial width; and
second teeth having a second maximum axial width greater than the first maximum axial width, the second teeth alternately arranged with the first teeth,
the second teeth each having insert portions to define the second maximum axial width thereof, and
a longitudinal midline of a lateral surface of the insert portions being offset relative to a plane extended radially through a center of a respective one of the second teeth, wherein the second maximum axial width of the second teeth is defined at the lateral surface of the insert portions,
wherein the sprocket is to rotate in a drive direction about a rotational axis thereof, wherein the insert portions are tapered at a first angle from the lateral surface toward a drive side of the second teeth relative to the drive direction, and tapered at a second angle greater than the first angle from the lateral surface toward a non-drive side of the second teeth relative to the drive direction.

18. A sprocket, comprising:
alternating first and second teeth,
the first teeth having a first maximum axial width, and the second teeth having a second maximum axial width greater than the first maximum axial width,
the sprocket to rotate in a drive direction about a rotational axis thereof,
the second maximum axial width of the second teeth defined by additional components to the second teeth,
the additional components excluded from the first teeth and including a lateral surface offset in a direction opposite the drive direction of the sprocket.

19. The sprocket of claim 18, wherein a midline of the lateral surface of the additional components is offset relative to a plane extended radially from a rotational axis of the sprocket through a center of a respective one of the second teeth.

20. The sprocket of claim 18, wherein the additional components are axially fit to a respective one of the second teeth.

21. The sprocket of claim 18, wherein the additional components include one or more protrusions, and the second teeth include one or more cavities formed in a recessed area, the additional components received within the recessed area, and the one or more cavities to receive the one or more protrusions.

22. A sprocket, comprising:
alternating first and second teeth,
the first teeth having a first maximum axial width, and the second teeth having a second maximum axial width greater than the first maximum axial width,
the sprocket to rotate in a drive direction about a rotational axis thereof,
the second maximum axial width of the second teeth defined by additional components to the second teeth,
the additional components including a lateral surface offset in a direction opposite the drive direction of the sprocket,
wherein the additional components include one or more protrusions, and the second teeth include one or more cavities formed in a recessed area, the additional components received within the recessed area, and the one or more cavities to receive the one or more protrusions.

\* \* \* \* \*